(12) United States Patent
Ou et al.

(10) Patent No.: US 10,915,467 B2
(45) Date of Patent: Feb. 9, 2021

(54) SCALABLE, PARAMETERIZABLE, AND SCRIPT-GENERATABLE BUFFER MANAGER ARCHITECTURE

(71) Applicant: Tidal Systems, Inc., Santa Clara, CA (US)

(72) Inventors: Michael Ou, Newark, CA (US); Jerry Wang, Hayward, CA (US); Meng Kun Lee, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/411,822

(22) Filed: May 14, 2019

(65) Prior Publication Data

US 2019/0266110 A1    Aug. 29, 2019

Related U.S. Application Data

(63) Continuation of application No. 15/689,453, filed on Aug. 29, 2017, now Pat. No. 10,318,448, which is a continuation of application No. 14/679,527, filed on Apr. 6, 2015, now Pat. No. 9,767,051.

(60) Provisional application No. 61/975,483, filed on Apr. 4, 2014.

(51) Int. Cl.
*G06F 17/50* (2006.01)
*G06F 13/16* (2006.01)
*G06F 13/42* (2006.01)

(52) U.S. Cl.
CPC ...... *G06F 13/1642* (2013.01); *G06F 13/1605* (2013.01); *G06F 13/1657* (2013.01); *G06F 13/1673* (2013.01); *G06F 13/4243* (2013.01); *Y02D 10/00* (2018.01)

(58) Field of Classification Search
USPC .................... 716/117, 132, 136, 138
See application file for complete search history.

(56) References Cited

U.S. PATENT DOCUMENTS

| | | | | |
|---|---|---|---|---|
| 5,911,147 A | * | 6/1999 | Onodera | G06F 12/0653 711/202 |
| 6,118,724 A | * | 9/2000 | Higginbottom | G11C 7/1018 365/230.05 |
| 6,625,685 B1 | * | 9/2003 | Cho | G06F 12/0607 711/105 |

(Continued)

*Primary Examiner* — Brian Ngo
(74) *Attorney, Agent, or Firm* — Brooks, Cameron & Huebsch, PLLC

(57) ABSTRACT

A buffer manager is generated by executing a script with respect to a buffer architecture template and a configuration file specifying parameters for the buffer such as, for example, number of memory banks, width of memory banks, depth of memory banks, and client bridge FIFO depth. The script converts the buffer architecture template into a hardware description language (HDL) description of a buffer manager having the parameters. Client bridges accumulate requests for memory banks in FIFO that is provided to a buffer manager upon the client bridge being granted arbitration. Accesses of memory banks may be performed one at a time in consecutive clock cycles in a pipelined manner. Client bridges and the buffer manager may operate in different clock domains. The clock frequency of the buffer manager may be increased or decreased according to requests from client devices.

20 Claims, 15 Drawing Sheets

(56) References Cited

U.S. PATENT DOCUMENTS

| | | | | |
|---|---|---|---|---|
| 6,820,209 B1* | 11/2004 | Culbert | G06F 1/3203 713/501 |
| 6,879,266 B1* | 4/2005 | Dye | G06F 12/08 341/51 |
| 8,060,679 B2* | 11/2011 | Nozaki | G06F 13/364 710/240 |
| 8,677,306 B1* | 3/2014 | Andreev | G06F 11/267 714/30 |
| 8,930,647 B1* | 1/2015 | Smith | G06F 3/0661 711/154 |
| 2001/0038642 A1* | 11/2001 | Alvarez, II | H03M 7/40 370/477 |
| 2002/0176430 A1* | 11/2002 | Sangha | H04L 49/901 370/412 |
| 2003/0101307 A1* | 5/2003 | Gemelli | G06F 30/30 710/305 |
| 2003/0217244 A1* | 11/2003 | Kelly | G06F 13/1684 711/168 |
| 2006/0117274 A1* | 6/2006 | Tseng | G06F 30/331 716/106 |
| 2008/0028187 A1* | 1/2008 | Casselman | G06F 13/409 712/37 |
| 2011/0145777 A1* | 6/2011 | Iyer | G06F 3/0629 716/132 |
| 2011/0261705 A1* | 10/2011 | Kamerkar | H04L 43/50 370/252 |
| 2011/0276766 A1* | 11/2011 | Fullerton | G06F 1/3206 711/149 |
| 2011/0276817 A1* | 11/2011 | Fullerton | G06F 13/1668 713/324 |
| 2012/0066471 A1* | 3/2012 | Sadowski | G06F 13/1673 711/172 |
| 2015/0006805 A1* | 1/2015 | Feekes | G06F 1/32 711/105 |
| 2016/0344629 A1* | 11/2016 | Gray | H04L 45/60 |

* cited by examiner

| Bank 0<br>16 bytes wide | Bank 1<br>16 bytes wide | Bank 2<br>16 bytes wide | Bank 3<br>16 bytes wide |
|---|---|---|---|
| Addr 0x0000 – 0x000F | Addr 0x0010 – 0x001F | Addr 0x0020 – 0x002F | Addr 0x0030 – 0x003F |
| Addr 0x0040 – 0x004F | Addr 0x0050 – 0x005F | Addr 0x0060 – 0x006F | Addr 0x0070 – 0x007F |
| Addr 0x0080 – 0x008F | Addr 0x0090 – 0x009F | Addr 0x00A0 – 0x00AF | Addr 0x0080 – 0x008F |
| Addr 0x00C0 – 0x00CF | Addr 0x00D0 – 0x00DF | Addr 0x00E0 – 0x00EF | Addr 0x00F0 – 0x00FF |

Fig. 7

| Slot 0 | Slot 1 | Slot 2 | Slot 3 | Slot 4 | Slot 5 | Slot 6 | Slot 7 |
|---|---|---|---|---|---|---|---|
| Address 0x0000 | Address 0x1000 | Address 0x2000 | Address 0x3000 | Address 0x4000 | Address 0x5000 | Address 0x6000 | Address 0x7000 |

Fig. 12

SCALABLE, PARAMETERIZABLE, AND SCRIPT-GENERATABLE BUFFER MANAGER ARCHITECTURE

PRIORITY INFORMATION

This application is a Continuation of U.S. application Ser. No. 15/689,453 filed on Aug. 29, 2017, which is a Continuation of U.S. application Ser. No. 14/679,527 filed Apr. 6, 2015, and issued as U.S. Pat. No. 9,767,051 granted on Sep. 19, 2017, which claims the benefit of U.S. Provisional Application Ser. No. 61/975,483 filed Apr. 4, 2014, the specifications of which are incorporated herein by reference.

BACKGROUND

Field of the Invention

This invention relates to systems and methods for designing and manufacturing a buffer manager.

Background of the Invention

Most chip designs use a centralized on-chip buffer memory to store user and system data. The buffer memories are implemented using fast on-chip SRAM. The centralized memory allows many different requestors (referred to as "Clients") who want to read from and/or write to the memory to share the same SRAM resource. These systems control the on-chip buffer memory using a single functional module commonly referred to as a "Buffer Manager" and which takes in read and write requests from the different clients. The Buffer Manager is responsible for managing the buffer SRAM resource and servicing all of the Client requestors.

The Buffer Manager implementation can vary greatly depending on the type of system it is designed in. Many systems are focused on maximizing system bandwidth while others are more concerned with minimizing power consumption. In addition, the memory capacity requirements will also vary greatly based on cost and performance tradeoffs. Low cost systems will use as little memory as possible in order to minimize cost while higher-end systems may implement more on-chip memory in order to increase system performance.

Because of the tradeoffs that have to be made between performance, power consumption and area, the Buffer Manager design in a chip is typically customized towards the requirements of the end application. Systems that need high performance will optimize the design towards that end by adding memories and enabling more parallel accesses. System that need to minimize power will run the clock at lower frequencies and also throttle memory accesses. Low cost systems will also use smaller SRAMs.

With each different application that is built, a new custom Buffer Manager needs to be designed towards that specific application. Since the design requirements are often diametrically opposed (e.g. high performance versus low power/low cost), the Buffer Manager usually will undergo significant changes to its design in order to meet the different needs in each system. The changes made for each system result in longer product cycles due to the new design and verification time of a different design. In addition, there are also maintenance issues in having to maintain multiple design Buffer Manager databases when the implementations are very different.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 7 is diagram illustrating the data striping configuration of a memory bank in accordance with an embodiment of the present invention;

FIG. 12 is a diagram illustrating a fixed slot access mode in accordance with an embodiment of the present invention;

DETAILED DESCRIPTION

Figure 1:
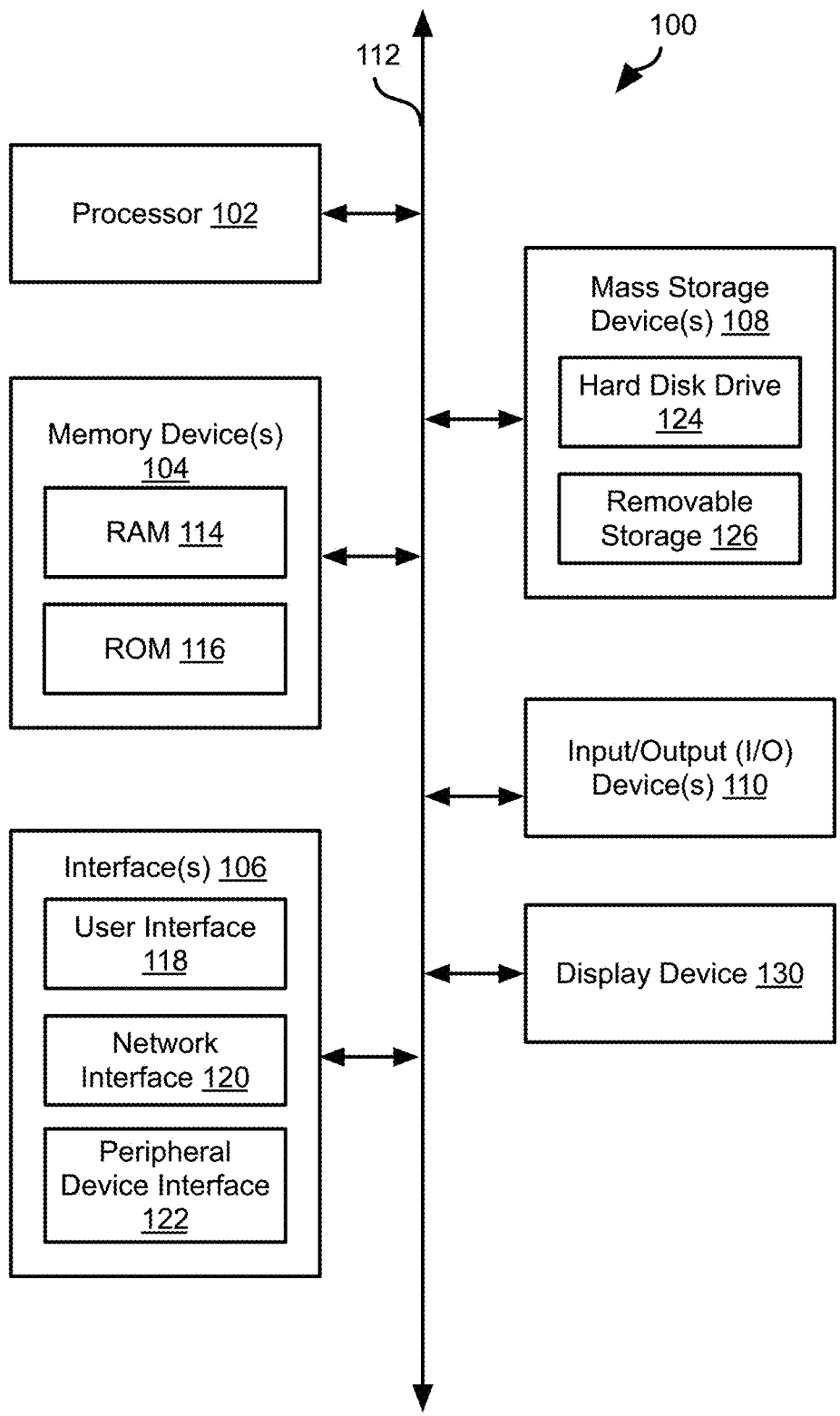
FIG. 1 is a schematic block diagram of a computing system suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. Accordingly, the invention has been developed to provide apparatus and methods for storing and accessing compressed data in a flash memory as described below.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram illustrating an example computing device 100. Computing device 100 may be used to perform various procedures, such as those discussed herein. Computing device 100 can function as a server, a client, or any other computing entity. Computing device can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

memory device(s) 104 include various computer-readable media, such as volatile memory (e.g., random access memory (RAM) 114) and/or nonvolatile memory (e.g., read-only memory (ROM) 116). memory device(s) 104 may also include rewritable ROM, such as flash memory.

Mass storage device(s) 108 include various computer readable media, such as magnetic tapes, magnetic disks, optical disks, solid-state memory (e.g., flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

1.1 Embodiment Overview

The embodiment discussed is a scalable, parameterizable, and script-generatable Buffer Manager architecture. The architecture is built to be easily scalable upwards in terms of performance or downwards for cost and power consumption. Some of the features of the architecture allow for less routing congestion and simpler layout, and also includes strategies to minimize power.

In addition, the architecture is also built to have the design easily generated through scripting tools. The architecture uses base template files and a configuration file of Buffer Manager parameters in conjunction with a scripting tool in order to allow for different versions of the Buffer Manager to be automatically generated through simply changing the parameter file. This allows high performance systems or also low cost/low power consumption systems to be generated from the same design database of template files. The ability to scale the design towards different applications reduces overall chip product development cycles. Use of the same database of template files also reduces maintenance effort.

2 Buffer Manager Description 2.1 Block Diagram

Figure 2:
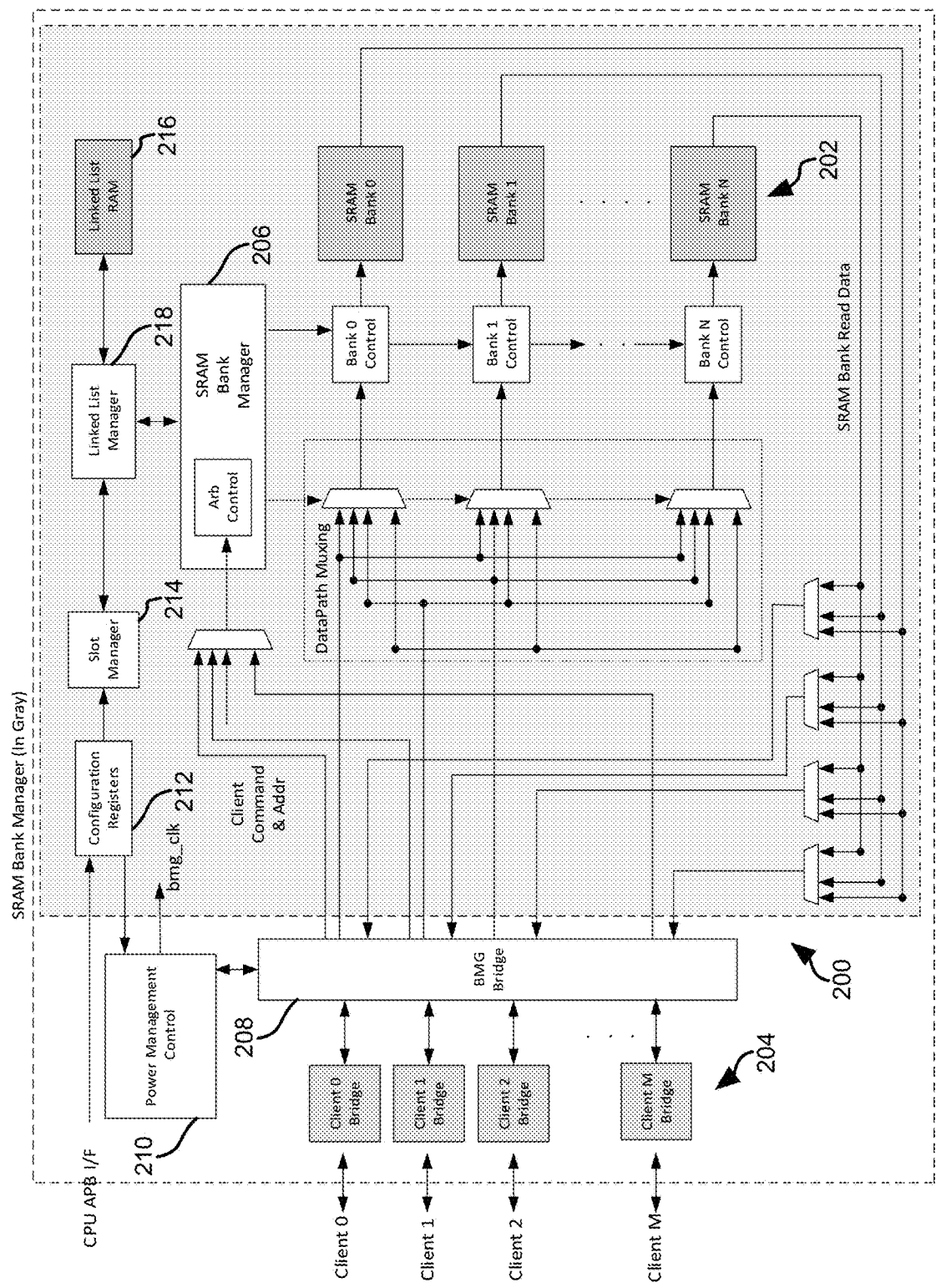
FIG. 2 is a high-level schematic block diagram of a buffer manager in accordance with an embodiment of the present invention.

A block diagram of the base implementation of the Buffer Manager is provided in FIG. 2. The Buffer Manager 200 is responsible for managing some or all data flows to the internal chip buffer. The Buffer Manager supports read and writes requests from multiple external Clients and handles the transfers of data between those Clients and a multi-bank internal SRAM 202. A Client Bridge module 204 acts as the go-between the Client and the Buffer Manager 200. The Client Bridge module 204 is instanced inside the Buffer Manager 200 and is tightly coupled with the internal pipelining and Bank Manager 206. One Client Bridge exists for each external Client.

In the diagram above, there are M+1 external Clients some or all requiring access to the buffer. The Clients make read and write requests through their connected Client Bridges 204. The Buffer Manager 200 receives some or all transfer requests through a top level bridge module 208, runs through arbitration and then performs the requested transfer to the internal SRAM banks 202.

2.2 Logical Memory Bank Structure

The architecture is built around several components whose utilization in the Buffer Manager framework allows for the scalability of size and performance and for the implementation to be script-generateable. The Buffer Manager base unit of memory storage consists of a "Logical Memory Bank". The Logical Memory Bank may define the minimum memory unit that can be read or written at a time. When the Logical Memory Bank is accessed, one address is read or written during a clock cycle and the full Logical Memory Bank width is accessible.

The Logical Memory Bank consists of one or more physical memory SRAM instances 202 based on the physical memory available in the target silicon technology. Typically this is the largest memory that can be compiled but this can be composed of multiple smaller memories. For example, a 256 KB Logical Bank may be comprised of a single 16K×128-bit memory, two 8K×128-bit memories, or possibly two 4K×256-bit memories. When two or more physical memories are combined to form one logical bank, additional logic is used to select which physical memory is actually read or written from. For both read and write operations, memory enable signals are used to specify which physical memory is activated for access. For read operations, a final output read mux will select which RAM's read data is actually returned.

Multiple Logical Banks are used in the Buffer Manager 200 to increase total memory storage and performance. Each Logical Bank can be accessed simultaneously, allowing for high Buffer Manager throughput. Since the Logical Banks are accessed in parallel, total Buffer Manager throughput is calculated by multiplying the number of Logical Banks with the bank width in bytes and by the clock frequency. For example, four Logical Memory banks each being 128-bits (16 bytes) wide that are accessed in parallel provide 64 bytes of data being read or written each clock cycle. At a 400 Mhz clock frequency, this provides 25.6 GBytes of Buffer Memory throughput.

Logical Banks may be constrained to be always the same size. The number of Logical Banks may be a power of two (so 2, 4, 8, 16, etc.) in order simplify the address calculation and implementation. The use of the regular and symmetric structure of the Logical Banks is a contributor to allowing the use of scripting tools to implemented scalable version of the design.

2.3 Parameterization Requirements

The Buffer Manager 200 is designed to support different performance and capacity requirements based on the target system that it is integrated in. This ranges from smaller embedded devices with a small internal buffer and lower throughput/lower power requirements to higher end client/ enterprise devices which have a larger internal buffer and higher performance demands. To manage these, the Buffer Manager architecture is designed to support parameterization for some or all of the following features:

Variable number of input Clients.
    Variable number of logical SRAM banks (such as a power of two, typically 2, 4, 8, or 16 banks)
    Variable power-of-2 logical bank width (typically 64, 128, or 256)
    Variable logical SRAM bank capacity (depth of SRAM entries)
    Support for different clock speeds.
    Variable number of Buffer Manager Slots
    ECC on specific Clients
    Parameterization is done through defined parameters in a configuration file and the use of a scripting tool to automatically generate HDL code for the target configuration. The actual generation is discussed in more detail in a following section.

2.4 Parameterization Example—Increasing Capacity

Figure 3:
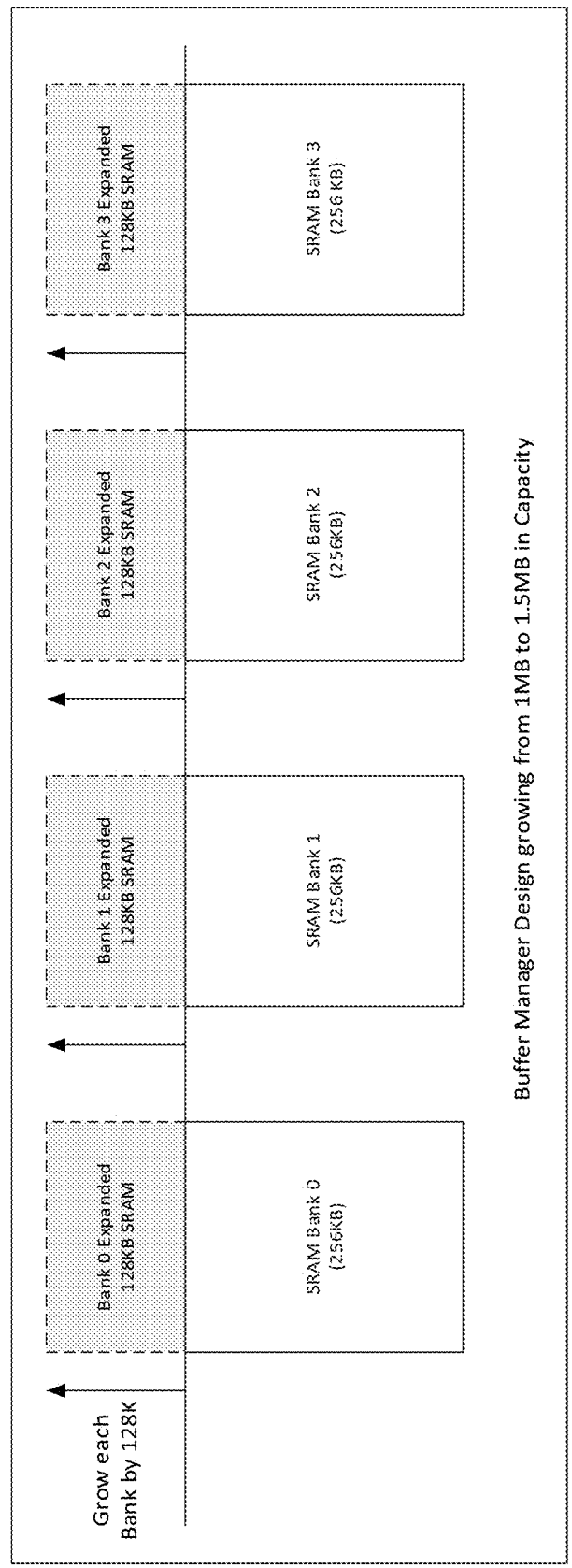
FIG. 3 is diagram illustrating the expansion of buffer manager capacity by increasing the number of entries in accordance with an embodiment of the present invention.

For this example, expanding the Buffer capacity can be performed by just increasing the number of entries for each logical SRAM Bank, as shown in FIG. 3. In the diagram below, the base Buffer Manager SRAM capacity is 1 MB. By increasing each logical bank by 128 KB, the entire buffer can be grown to a capacity of 1.5 MB. Note that in some embodiments, all banks have to be increased by the exact same size.

2.5 Parameterization Example—Increasing Performance by Widening Bank

Figure 4:
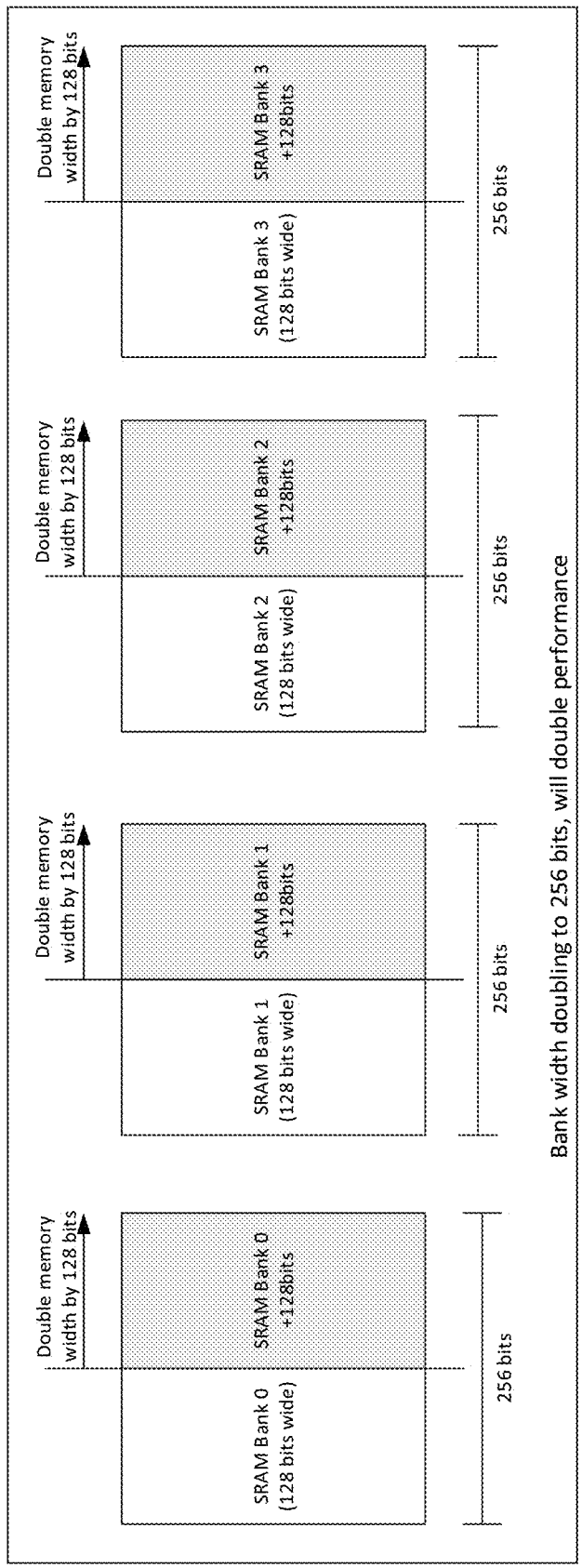
FIG. 4 is diagram illustrating the expansion of buffer manager capacity by increasing the width of entries in accordance with an embodiment of the present invention.

For this example, the buffer throughput can be doubled by widening the bank width from 128 to 256 bits, as shown in FIG. 4. This will effectively double the buffer performance. For this example, the capacity also doubles because the same SRAM size is being used when widening the bank width.

Figure 5:
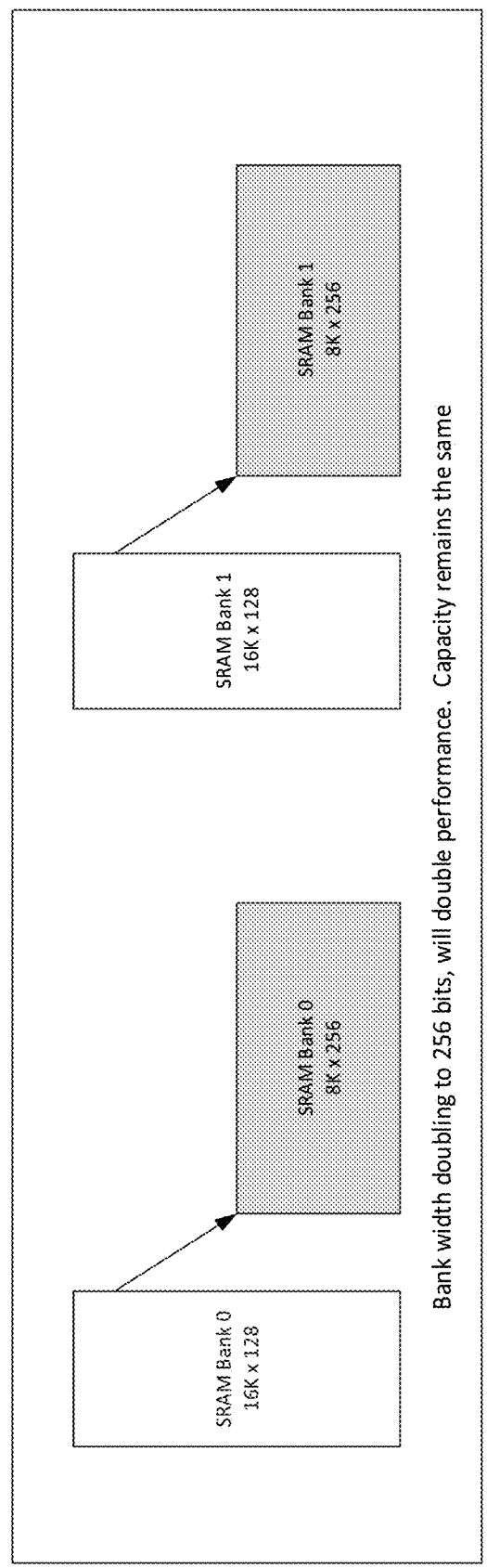
FIG. 5 is diagram illustrating the increasing of buffer capacity by adding banks in accordance with an embodiment of the present invention.

If capacity needs to be maintained, then as the bank width doubles, the number of entries per bank may be halved in order to preserve the same RAM area footprint, as shown in FIG. 5. This is shown in the example below.

2.6 Parameterization Example—Increasing Performance by Doubling Banks

Figure 6:
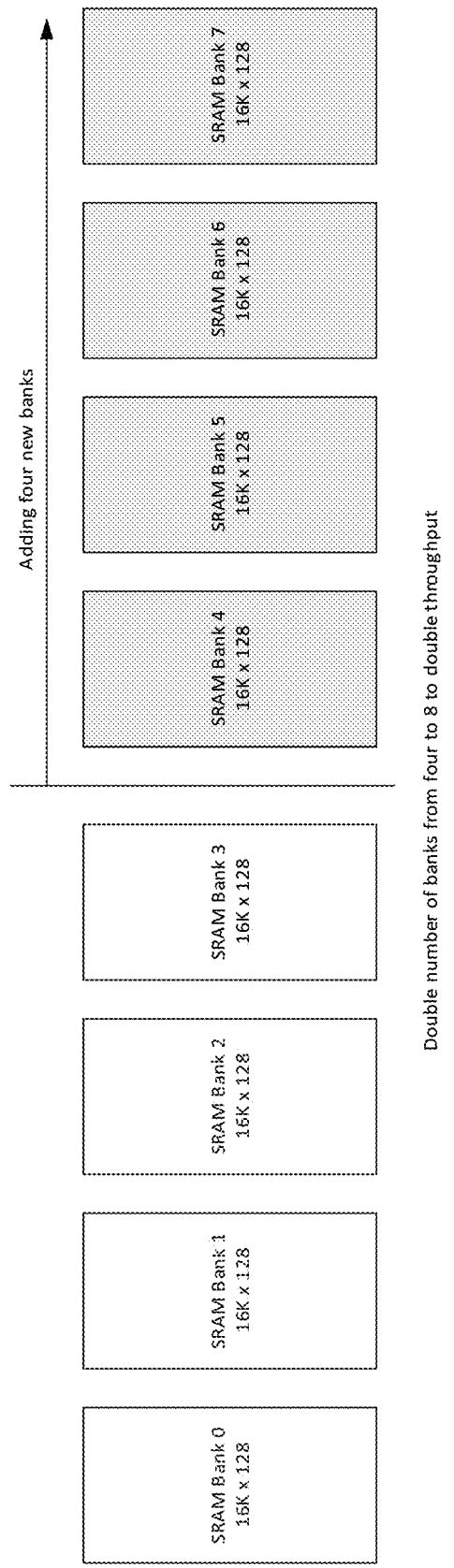
FIG. 6 is diagram illustrating the expansion of buffer manager capacity by increasing the number of entries in accordance with an embodiment of the present invention.

Performance can also be increased by doubling, or applying some other multiple to, the number of banks that can be accessed at a time, as shown in FIG. 6. The diagram below shows the buffer increasing from 4 active banks to 8 active banks, which will double throughput. If the same bank size is used, then the capacity would double. Otherwise, if the capacity needs to remain the same, then the number of entries per bank would halve.

2.7 Single-Line Data Stripe

A component of the Buffer Manager framework in some embodiments is use of a single-line data stripe as the basic unit of read or write access. This is defined as the full memory width of data at the same memory address across some or all existing Logical Banks. For a configuration using eight Logical Banks, each of which is 128-bits wide, a single-line data stripe consists of 128 bytes (8 memory banks each*16 bytes wide).

Read and write transfers may all occur using the same address, but each Logical Bank is accessed in consecutive cycles. This pipelined access is another feature of the Buffer Manager framework in some embodiments. Allowing the accesses to each data stripe occurring one cycle per bank allows a more regular data throughput, where only one bank width's worth of data needs to be available at a time, instead of the full data stripe width. For example, with 8 banks of memory 16 bytes wide, only 16 bytes (128-bits) need to be available per cycle to write, instead of having to present the full 128 bytes from a single requestor.

A diagram of the data layout is provided below for a four-memory bank configuration, each bank being 16 bytes wide if provided in FIG. 7. During write operations, data is written across some or all banks one line at a time as depicted in the figure above. For a burst write of 64 bytes starting at address 0x0000, the first 16 bytes are written to Bank 0 address 0x0, then the next sixteen bytes are written to Bank 1 address 0x0, then the next 16 bytes are written to Bank 2 address 0x0, and then the last 16 bytes are written to Bank 3 address 0x0. During Read Operations, data is read across some or all banks one line at a time. For both read and write transfers, each logical bank is accessed in consecutive cycles.

The use of the single line stripe along with the pipelined access has some added advantages. The first is use of a single arbiter structure, where the arbiter selects which requestor gets access to the memory on every cycle. This single arbiter structure is another component of the Buffer Manager Framework in some embodiments. Use of a single arbiter across some or all banks instead of having each Logical Bank having its own separate arbiter greatly reduces logic and routing congestion. The single arbiter may be physically placed near the first memory bank in order reduce routing congestion.

One additional advantage of the single line stripe is that it reduces or minimizes the transfer requirements for the connected Client Bridges for write and read operations. The Client Bridges require data storage (typically FIFOs) to be able to present some or all of the data at the time it needs to be transferred. Selecting the access to be just a single line minimizes that FIFO data storage. For example, for a configuration of four memory banks, each being 16 bytes wide, the Client Bridge will require a 64 byte FIFO to write out the full stripe width data to the stripe or receive the full stripe of data when it is granted arbitration. Using a larger line stripe size (e.g. 128 bytes or 256 bytes) would require a larger internal FIFO in the Client Bridge which results in more area and cost.

2.8 Bank Address and Control Pipelining

When arbitration is granted for the memory, the request's address and control information (the control information including memory read/write direction and memory enables) is pipelined along the memory banks using single flop stages. This reduces routing congestion significantly. The ability to pipeline the address and control across the memory banks is another component of the Buffer Manager Framework in some embodiments and is a result of the single line stripe and single arbiter aspect of the design.

Figure 8:
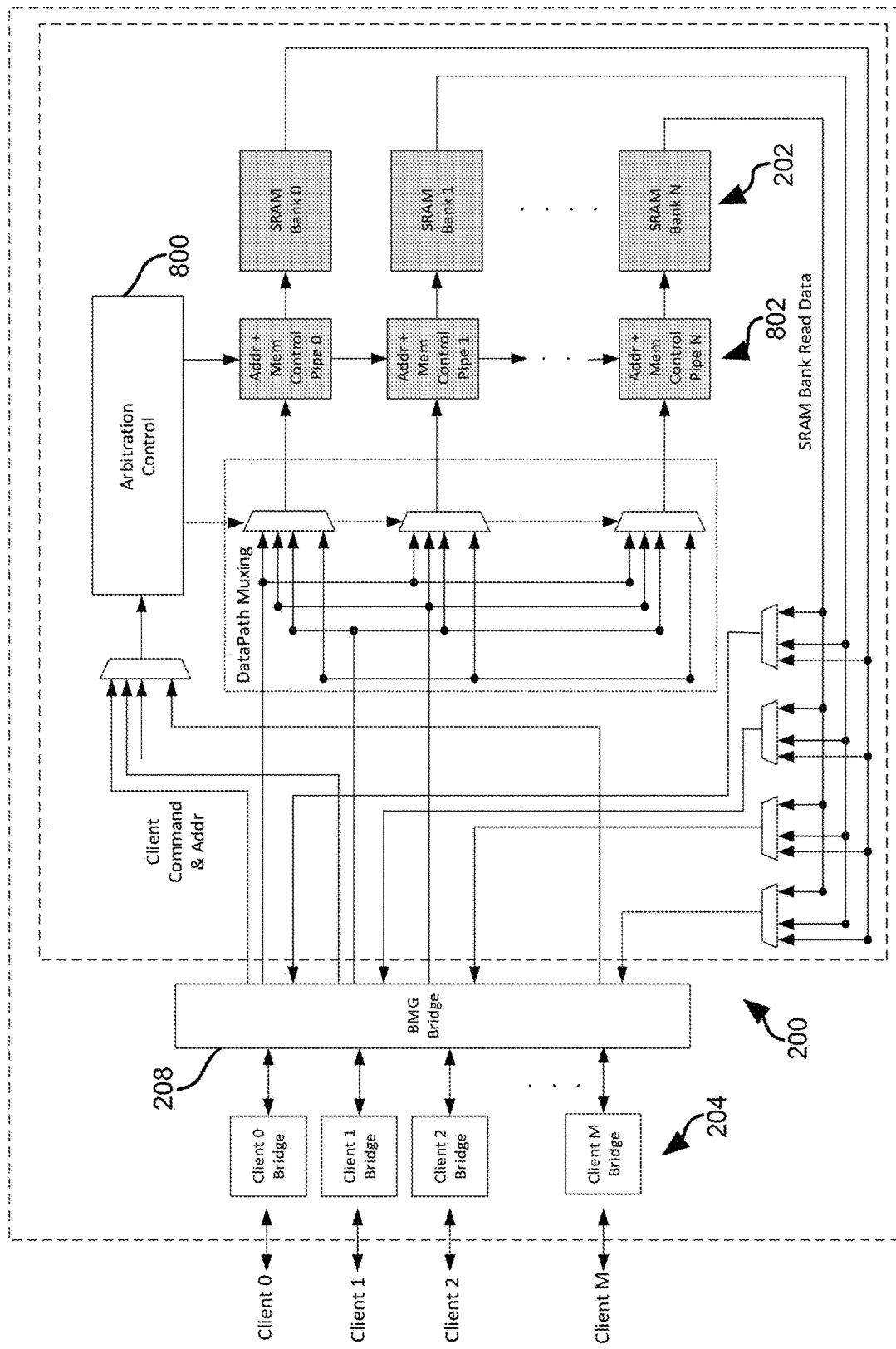
FIG. 8 is diagram illustrating address and memory control signal pipelining in accordance with an embodiment of the present invention.

The diagram of FIG. 8 is another version of the top level Buffer Manager 200 block diagram but with the pipelined address and memory highlighted along with the actual SRAM banks themselves. The diagram illustrates the single arbiter module 800 along with the pipelined address and memory control 802. The SRAM Bank 0 through Bank N are the physical instances of the compiled memories which are placed on the chip in the above layout. The single arbiter module 800 is placed near SRAM Bank 0. The selected address and memory control is sent out of the arbitration control 800 and registered in the Address+Memory Control Pipe stage 802 (Pipe 0). The pipe stage output of pipe 0 directly drives the SRAM 0. The Address+Mem Control Pipe Stage 0 output feeds the second pipe stage (Pipe 1) which registers the same signals and then uses these to drive SRAM Bank 1, and so on through pipe N and SRAM bank N. This pipelining of the address and memory control along the chain of SRAM's simplifies routing and complexity for the memory and address, as the connections are from register outputs directly to another register inputs without any complex selection or combination logic.

Note that the pipelining structure only exists for address and memory. The input and output datapaths have a more traditional multiplexed structure and results in more routing and logic to manage those.

2.9 Control Pipelining Example

Figure 9:
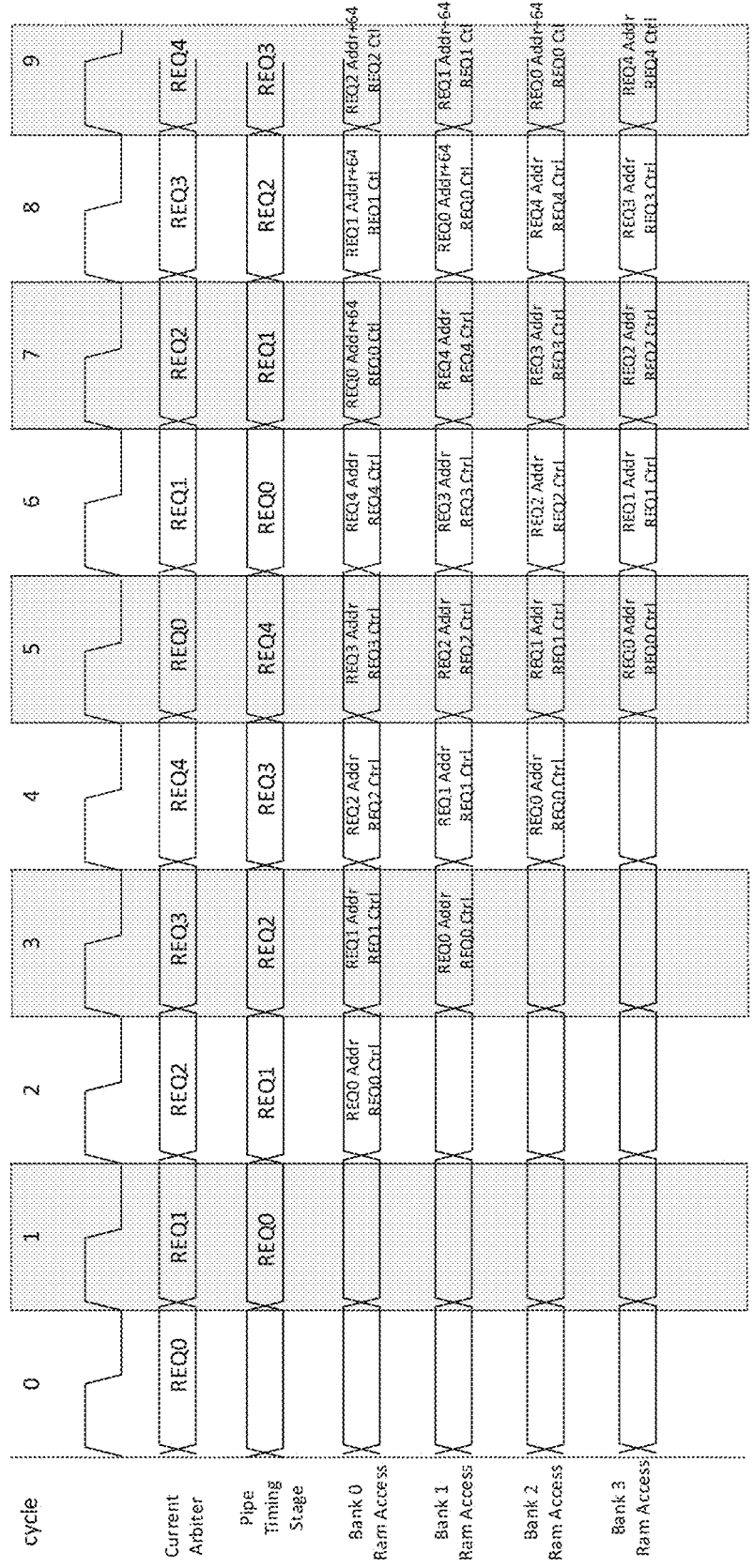
FIG. 9 is a control signal diagram of a arbitration pipeline flow in accordance with an embodiment of the present invention.

FIG. 9 illustrates a waveform that provides an example of how the arbitration works with the address and control pipelining when accessing the different memory banks. In this example there are five active requestors (REQ0-REQ4) and four memory banks, each 128 bits wide (so each memory stripe is a total of 64 bytes). In each cycle a different requestor obtains arbitration.

In Cycle 0, REQ0 gets arbitration.

In Cycle 1, REQ1 gets arbitration while the REQ0 info is passed along a pipeline timing stage.

In Cycle 2, REQ2 gets arbitration, the REQ1 info is passed along a pipeline timing stage, and the REQ0 address/control info is sent to Logical Bank 0 for the memory access.

In Cycle 3, REQ3 gets arbitration, the REQ2 info is passed along the pipeline timing stage, the REQ1 address/control info is sent to Logical Bank 0 for the memory access, and the REQ0 address/control info is sent to Logical Bank 1 for the memory access.

In Cycle 4, REQ4 gets arbitration, the REQ3 info is passed along the pipeline timing stage, the REQ2 address/control info is sent to Logical Bank 0 for the memory access, the REQ1 address/control info is sent to Logical Bank 1 for the memory access, and the REQ0 address/control info is sent to Logical Bank 2 for the memory access.

In Cycle 5, REQ0 gets arbitration again, the REQ4 info is passed along the pipeline timing stage, the REQ3 address/control info is sent to Logical Bank 0 for the memory access, the REQ2 address/control info is sent to Logical Bank 1 for the memory access, the REQ1 address/control info is sent to Logical Bank 2 for the memory access, and the REQ0 address/control info is sent to Logical Bank 3 for the memory access.

In Cycle 6, REQ1 gets arbitration again, the REQ0 info is passed along the pipeline timing stage, the REQ4 address/control info is sent to Logical Bank 0 for the memory access, the REQ3 address/control info is sent to Logical Bank 1 for the memory access, the REQ2 address/control info is sent to Logical Bank 2 for the memory access, and the REQ1 address/control info is sent to Logical Bank 3 for the memory access.

In Cycle 7, REQ2 gets arbitration again, the REQ1 info is passed along the pipeline timing stage, the REQ0 address/control info is sent to Logical Bank 0 for the memory access, the REQ4 address/control info is sent to Logical Bank 1 for the memory access, the REQ3 address/control info is sent to Logical Bank 2 for the memory access, and the REQ2 address/control info is sent to Logical Bank 3 for the memory access.

In Cycle 8, REQ3 gets arbitration again, the REQ2 info is passed along the pipeline timing stage, the REQ1 address/control info is sent to Logical Bank 0 for the memory access, the REQ0 address/control info is sent to Logical Bank 1 for the memory access, the REQ4 address/control info is sent to Logical Bank 2 for the memory access, and the REQ3 address/control info is sent to Logical Bank 3 for the memory access.

In Cycle 9, REQ4 gets arbitration again, the REQ3 info is passed along the pipeline timing stage, the REQ2 address/control info is sent to Logical Bank 0 for the memory access, the REQ1 address/control info is sent to Logical Bank 1 for the memory access, the REQ0 address/control info is sent to Logical Bank 2 for the memory access, and the REQ4 address/control info is sent to Logical Bank 3 for the memory access.

This arbitration pipelining continues until the requests are completed. Note that the address and control for a given requestor are the same across some or all banks for that arbitration slice. For example, in the diagram above, in cycles 2 through 5, the memory address and control for Requestor 0 are the same for some or all cycles, but presented to each consecutive memory bank in consecutive cycles. When Requestor 0 is granted arbitration again, its address increments by 64 bytes due to the slice being 64 bytes, and then this same address and control is presented to the memory banks during cycles 7 through 10 (the last cycle 10 not pictured).

2.10 Client Bridges

Another component of the Buffer Manager architecture is the use of a specialized and tightly coupled Client Bridge module 204 in some embodiments. The Client Bridge 204 presents a single uniform interface to some or all Client Requestors. The Client Bridge 204 utilizes a common Client Bridge-to-Buffer Manager signal protocol which is pipelineable and which is tightly coupled with the Buffer Manager 200 internal logic in terms of the pipeline stages and control. The use of the uniform Client signal protocol on the Client Bridge side and the common Client-Bridge to Buffer Manager interface signaling allows a very repeatable structure which is easily generatable through automated scripting tools.

2.10.1 Client Bridge Block Diagram

Figure 10:
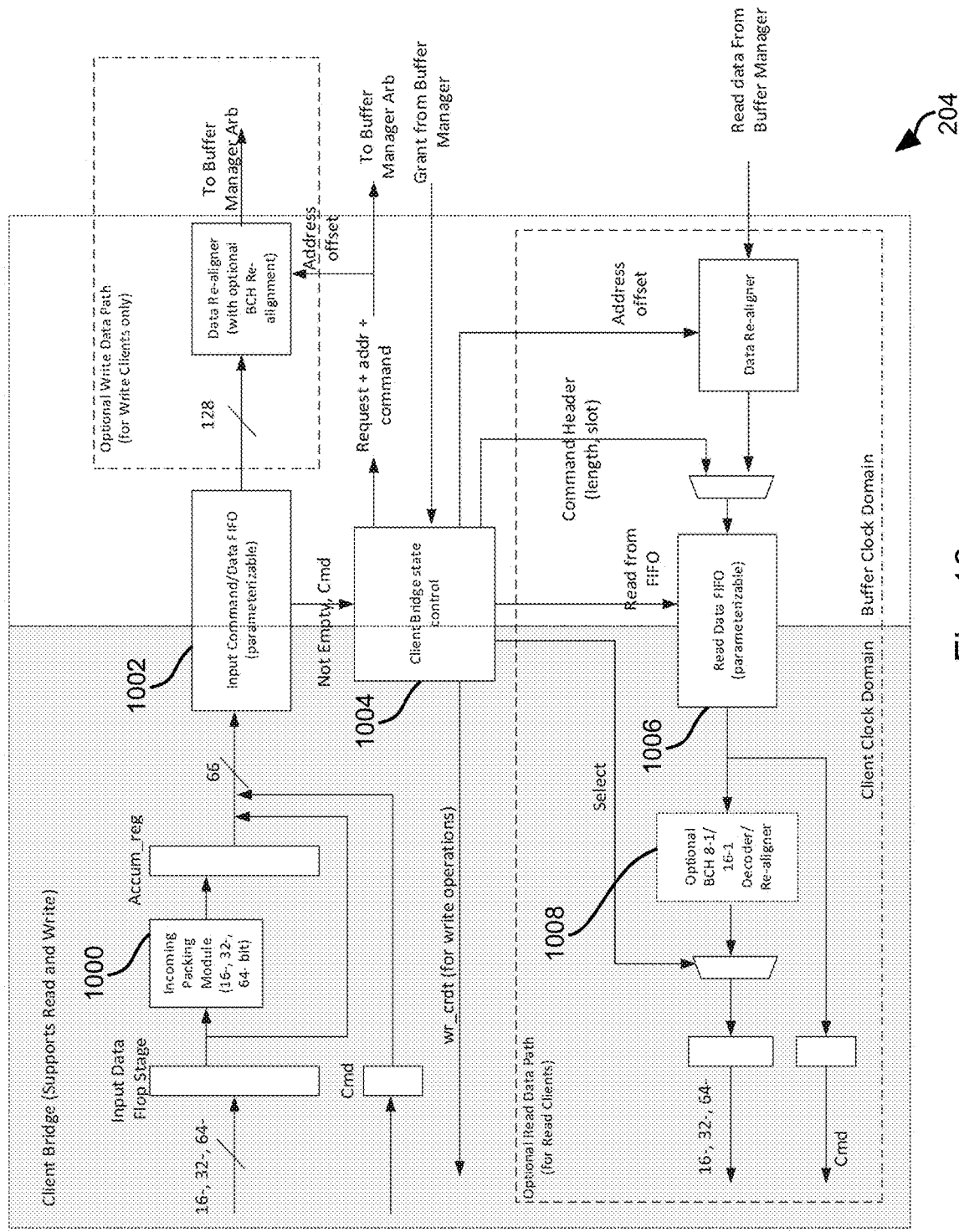
FIG. 10 is a diagram illustrating a client bridge in accordance with an embodiment of the present invention.

FIG. 10 depicts a Client Bridge 204 design. Commands come into the Client Bridge 204 through a standard defined datapath interface. This can be either 16-, 32- or 64-bits wide. The internal logic 1000 packs the incoming pieces together into a single 64-bit command word and stores this in an input Command/Data FIFO 1002. Commands are processed by the main Client Bridge State Control Block 1004. For Write transfers, the write data is also stored in the same incoming Command/Data FIFO 1002. The FIFO width matches the logical memory bank width.

The Client Bridge state control module 1004 manages the data transfer. It will issue an arbitration request to the Buffer Manager 200. For Write transfers, the Client Bridge State Control 1004 makes sure there is enough data available to burst to the Buffer Manger 200 before requesting arbitration.

Once arbitration is granted, the write data is immediately sent out of the FIFO 1002 in the following cycle and transmitted to the Buffer Manager 200. When some or all data has been processed for that command, any subsequent commands stored in the FIFO can be executed.

For Read transfers, once the arbitration request is granted by the Buffer Manager 200 (as indicated by an incoming signal), the data transfer immediately begins. Data being read from the Buffer will be stored in its incoming FIFO 1006. This will be then streamed out and sent to the requesting Client on its clock domain.

Note that for Read-only clients, the Write Datapath logic (1000, 1002) is unconnected and will be optimized away during synthesis. In addition, the input command FIFO width and depth can be reduced to save logic. For Write-only clients, the entire Read datapath (e.g. FIFO 1006 and decoder/re-aligner 1008) is unconnected and will be optimized away during synthesis).

The Client Bridges 204 also has an option to append ECC bytes to protect the incoming data. Clients whose data requires high data integrity and need some type of ECC protection can enable this parameter to have an ECC module generated and inserted into the datapath. Other clients who utilize other means of data protection or which do not require high data integrity will not use this ECC module.

2.10.2 Client Bridge Clocking and Dynamic Clock Scaling

A feature of the Client Bridge 204 in some embodiments may be that it contains synchronization logic and allows the requestor's clock to be completely asynchronous to the Buffer Manager 200. This allows the entire Buffer Manager 200 to run on its own clock. The ability of the Buffer Manager 200 to run completely asynchronous to any of its Client requestors is another advantageous aspect of the Buffer Manager in that it may advantageously allows the performance to be scaled up when more throughput is needed by increasing the Buffer Manager Clock frequency. It also allows the power consumption to be reduced by lowering the clock frequency.

This ability to scale the clock frequency allows implementation of another important feature of the Buffer Manager 200, which is the use of "Request Driven Dynamic Clock Scaling". When the maximum available throughput across the Buffer Manager banks is much greater than the requested throughput based on the number of requestors, the clock frequency can be dynamically scaled down in order to reduce power consumption and still provide sufficient memory throughput to the Clients. For example, in an eight Logical-Bank memory configuration with each bank 16 bytes wide, the throughput per clock cycle is 128 bytes. When running at 400 Mhz, this means 51.2 GB of maximum throughput is available. If 8 clients are actively requesting but each client only needs 1 GB of throughput for a total of 8 GB of memory bandwidth, then the Buffer Manager clock can be divided down by 4 to run at 100 Mhz, thus reducing power by 4× and still providing sufficient throughput (12.8 GB). As those Clients complete their requests and throughput needs are further reduced, the clock can be scaled down further to minimize power consumption even more. If higher throughput Clients begin making new requests, the clock can be increased again to provide more throughput.

Referring again to FIG. 2, to manage the Request Driven Dynamic Clock Scaling, the Buffer Manager contains a Power Management module 210 (see FIG. 2), which monitors which clients are actively requesting. Each Client has an associated configuration register 212, which indicates the client's required throughput for its peak transactions. In addition the Buffer Manager Power Management unit 210 can also monitor the FIFO (e.g. FIFOs 1002, 1006 of FIG. 10) depth usage for writes and the number of queued read commands to determine the active request throughput generated by a Client. Once an approximate active bandwidth number has been calculated, the Buffer Manager clock can be scaled up or down depending on the throughput needs.

Clock scaling may be done through an integer clock divider driving the Buffer Manager main clock, where the clock can be increased or decreased by an integer amount based on the divider. The clock switching may be done glitch free so that the clock frequency can be changed on a cycle-by cycle basis if necessary.

Figure 11:
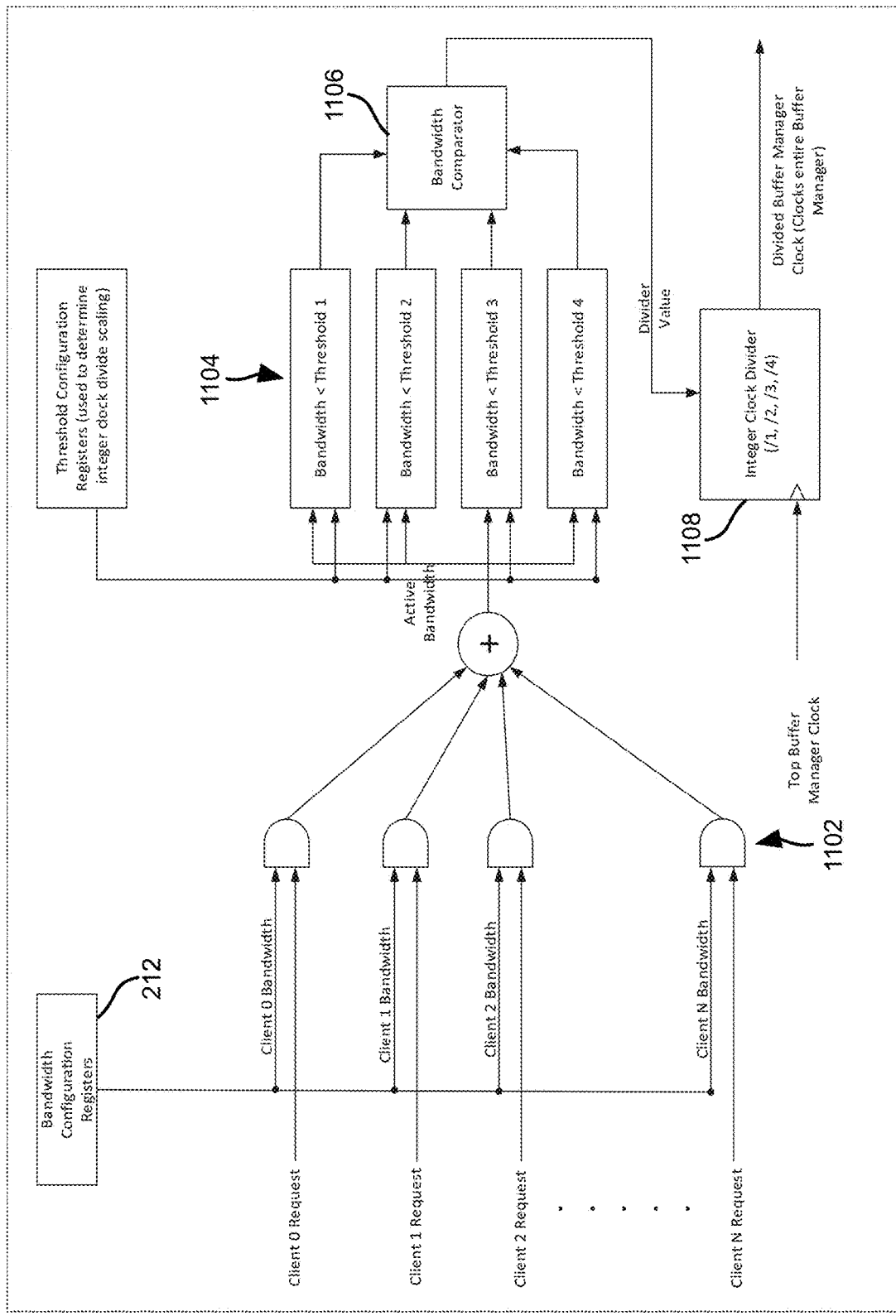
FIG. 11 is a diagram illustrating a dynamic clock scaling unit in accordance with an embodiment of the present invention.

FIG. 11 illustrates an example configuration for dynamic clock scaling. FIG. 11 shows one implementation of the dynamic clock scaling circuitry made possible through the Buffer Manager framework. In the implementation there are a total of N+1 Client requestors. Associated with each client requestor is a memory bandwidth value programmed in a configuration register 212. When a Client is inactive, the bandwidth value is masked out, such as by AND gates 1100 that take as inputs the bandwidth value and AND it with a request from the client (if any). When the Clients are actively requesting memory, the Bandwidth throughput value is passed through the AND gates 1102 and accumulated to obtain an active bandwidth value. Where the client is not actively requesting memory, the output of the AND gates is zero.

The active bandwidth value (e.g. the sum of the outputs of the AND gates 1102) is compared against another set of pre-programmed threshold registers 1104. The threshold registers define the scaling values which are used by bandwidth comparator 1106 to select which clock divide ratio to use, then comparators are used as part of the logic to determine the clock scaling. If the active bandwidth is greater than some or all thresholds, this means the buffer request bandwidth is at the maximum value so no clock division should be used. If the active bandwidth is less than Threshold 1 but greater than Threshold 2, 3, and 4, then the clock is divided down by 2. If the active bandwidth is less than Thresholds 1 & 2 but greater than 3 & 4, then the clock is divided down by 3. The bandwidth comparator 1104 goes through some or all combinations in order to find the proper clock divider value to select. The final calculated divide value is passed to the Integer Clock Divider 1108 to scale down the clock accordingly and the clock frequency of the Buffer Manager 200 is set to the output of the Integer Clock Divider 1108.

The occurrence of clock division can occur on a user-determined granularity. For example, clock division may occur every cycle or on a periodic basis based on another configuration register.

The above is one such implementation of the clock scaling unit but other implementations may also be used including different types of comparator circuitry, and more configuration and threshold registers to provide more clock divide value granularity.

2.11 Access Modes and Memory Management

The Buffer Manager may be programmed to support on or both of the two access modes described below. The first is direct addressing where the Client requestor issues an address which maps directly to the internal SRAM. In this usage model, the firmware driving the client requestors is completely responsible for managing the memory usage and making sure the Client Requestors do not improperly overwrite each other's memory space.

In the second mode of operation, the Buffer Manager supports "Slot Access Mode", where the memory is addressed through a Slot ID. For this mode of operation, the Buffer RAM is physically divided into a number of 'Slots'. Each Slot represents a non-overlapping physical unit of memory that can be read or written by a Client. Clients will perform read and write accesses with the Slot ID, and data will be read or written only to that Slot. It is up to the Client to not overflow a Slot by writing too much data or reading past the Slot boundaries. This usage model simplifies the firmware management in that it only has to manage a limited number of slots instead of the entire memory space. The Clients are assigned specific slots by firmware and only those Clients can access its assigned slots. The internals of how those slots are actually mapped to physical SRAM address is hidden from firmware by the Buffer Manager 200.

Slot allocation and de-allocation is managed by firmware but supported by hardware. The hardware provides a bitmap register array (e.g. slot manager 214 of FIG. 2) that indicates which Slots are in use. When firmware requests a Slot, the hardware will return an ID number of the Slot to be used by firmware. Firmware then programs the Clients to refer only to that assigned Slot when transferring data to and from the buffer. Once a Slot's data has been read and is no longer required, firmware can de-allocate the Slot by issuing a de-allocation request to the Buffer Manager 200 for that particular ID. The Buffer Manager 200 then clears the appropriate bit in the bit map array which indicates that Slot is no longer in use and can be re-allocated later again.

2.12 Slot Implementation

2.12.1 Fixed Size Slot Mode

For Slot Access Mode, there are two modes of operation. The first mode of operation uses a single fixed slot size for some or all slots. The "fixed" size is actually initially set through a configuration register (e.g. configuration register 212 of FIG. 2) so that it can be changed during system initialization, but once the fixed size is set, it is not changed during system operation. The Buffer Manager then divides the physical SRAM up based on the size and then assigns Slot ID's to each physical segment.

The fixed size is simpler to implement but when data stored in the fixed size Slots does not entirely fill up the Slot, then buffer space is being wasted, which lowers buffer utilization and efficiency. For example, if the Slot size is 4 KB and only 1 KB of data is being written to the Slot, then the remaining 3 KB is not used and represents wasted buffer space.

2.13 Fixed Size Slot Mode Diagram

FIG. 12 illustrates an example of fixed slot mode. In FIG. 12, the buffer region is 32K and the slot size is 4K. The buffer is divided into 8 slot fragments, with Slot 0 physically located at 0x0000 and the subsequent slots located at consecutive 4K address boundaries. When Slot 0 is accessed, data is written from address 0x0000 through 0x0FFF. Slot 1 starts at 0x1000 and ends at 0x1FFF. The other slots exist at the subsequent 4K address boundaries and are addressed similarly.

2.13.1 Linked Lists Micro-Slot Mode

In the second mode of operation, the slots are comprised of smaller fixed-size segments, called "micro-slots". The micro-slots size are configurable in size to power-of-two number of bytes. The target sizes for the micro-slots in the preferred implementation will be 64 bytes, 128 bytes, 256 bytes, or 512 bytes. The Slots are then comprised of one or more of the micro-slots, depending on how much space is needed for the data transfer. For example, if the data to be written is a total of 2K and the micro-slot size is 128 bytes, then a total of 16 micro-slots are assigned for that particular Slot. Using the smaller-size resolution allows for much higher buffer memory utilization and efficiency, as less space is wasted.

Since the number of micro-slots are variable in nature, a linked list data structure (e.g. linked list RAM 216 of FIG. 2) is used inside the Buffer Manager to track which micro-slots belong to which Slot. When a Slot is allocated by hardware, the internal hardware (e.g. linked list manager 218 of FIG. 2) will go through a master linked list of micro-slots and then will assign the next available micro-slots to a given Slot. A separate memory structure (e.g., linked list RAM 216) keeps track of which micro-slots are assigned to which allocated Slot. The micro-slot assignments do not have to be contiguous as after many allocations and de-allocations the available and assigned micro-slot lists will likely become very fragmented. The linked-list structure is used to manage the fragmentation and to track where the next assigned and free micro-slots will be located.

2.14 Linked Lists Micro-Slot Diagram

Figure 13:
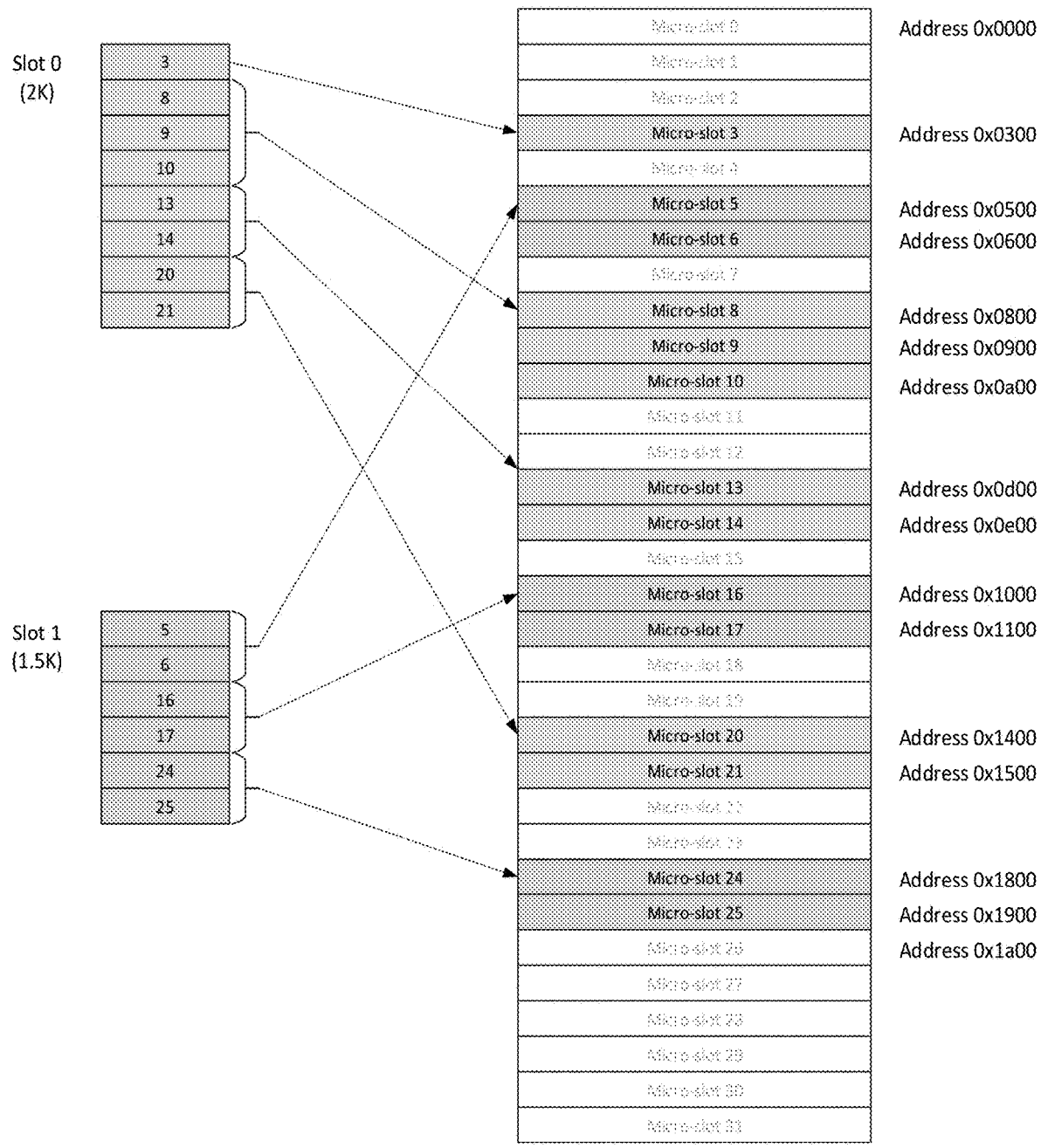
FIG. 13 is a diagram illustrating a variably-sized slot access mode in accordance with an embodiment of the present invention.

Referring to FIG. 13, for example, Slot 0 is used to store 2K of data. Each micro-slot is defined as 256 bytes and exists in the buffer at 256 byte boundaries. When Slot 0 is allocated 2K of memory, it is assigned the next available 8 micro-slots. Since the available micro-slot memory may be highly fragmented, the micro-slots will often not be contiguous. In the example above, Slot 0 has been assigned micro-slots 3, 8-10, 13-14, and 20-21. Slot 1 only will store 1.5K of data so only 6 micro-slots are assigned to it, which are micro-slots 4-5, 16-17, and 24-25. Using the micro-slot approach allows better memory utilization and efficiency.

3 Implementation and Script-Generation

3.1 Description

An aspect of the Buffer Manager architecture in some embodiments is the ability to automatically generate different Buffer Manager implementations through use of scripting languages. The implementation of the design is through a hardware description language (HDL), which gets synthesized to logic gates, with Verilog as the preferred HDL language for implementation. The base design is coded using Verilog scripting template files. These template files describe the core structure of the internal design modules such as the arbitration logic, bank management, slot allocation bit-map, and memory controller logic. The templates also provide structure to define how the design is replicated or scaled for the components that support scalability.

A scripting tool, such as Verilog pre-processor and/or Perl-based tools, is used in conjunction with a configuration file of Buffer Manager parameters to generate the final built-out version of the HDL code. The combination of these results in a Buffer Manager framework and architecture, which can generate very different versions of a Buffer Manager for a wide variety of applications.

The design of the scalable Buffer Manager architecture allows for scalability of several parameters. These are defined in a separate configuration file and are used to generate the final version of the HDL code. These include:

- Number of Memory Banks: This describes how many logical banks are instantiated in the design. The number of memory banks specified may advantageously be used to determine the Buffer Manager throughput and also the total capacity. The number of logical banks may advantageously be a power-of-2 for ease of address decoding (so 2, 4, 8, 16, etc.).
- Logical Memory Bank Width: This defines the width in bits of each Logical Memory Bank. The number is the same for some or all banks. This is another component for determining both the Buffer Manager throughput and capacity.
- Bank Depth: This indicates how many memory entries are in each Logical Bank. This parameter determines the total Buffer Manager memory capacity. For example, a Logical Bank, which is a total of 256 Kbytes and is 128-bits wide, would have 16K 128-bit entries.
- Number of Client Requestors: This parameter indicates how many external clients are connected to the Buffer Manager. Each Client has an associated Client Bridge acting as the interface module to the Buffer Manager. This parameter is used to automatically generate the proper number of input and output ports for each requestor into the Buffer Manager and also to instantiate the Client Bridges in the design. In addition, this parameter is used to create the arbiter module, which manages the arbitration between some or all of the input Client Requestors.
- Internal Client Bridge FIFO sizes: The internal FIFO sizes inside the Client Bridges are specified as parameters, which can be increased or decreased, based on the system performance, power, and area requirements.
- Number of Slots: The total number of supported Slots is specified as a parameter in the design that is used to build out the bit-map register array and associated control that keeps track of which Slots are used and which are free.

In addition to the above parameters, the design also uses configuration registers to define the fixed Slot size and also micro-slot size when the Slots are built out of linked lists of micro-slots. These are not parameters that are used in the build process. However, allowing variance of size through configuration registers supports more flexibility in the overall design for better memory management and buffer efficiency.

3.2 Methodology

The above parameters are defined in a system configuration file, which describes the Buffer Manager design for the target system. The parameter values are set to meet the system specifications and requirements. For example, a high performance system may require many more Client Requestors and wider logical memory banks, so those two particular parameters would be set higher. A lower end system would have smaller memories and less requestor, so those two parameters would be reduced. This configuration file is read by the scripting tool and used in conjunction with the Verilog template files to generate the Verilog implementation.

For example, in a particular system the number of Client Requestors may be set to 32 in the parameter file. The arbitration module Verilog template defines the round robin arbitration logic but is structured for a variable number of clients. When the scripting tool reads the configuration file parameter specifying a system with 32 Client Requestors, it uses that number and builds out the HDL code to implement an arbitration module supporting 32 Requestors. Similarly, the top level Buffer Manager Verilog template file defines a basic interface as to how a Client will interface to the Buffer Manager. The scripting tool will use the 32 Client requestor parameter and generates 32 Client interface ports. It also builds out a Client Bridge for each requestor in the Buffer Manager top-level module.

The other parameters allow additional pieces of the Buffer Manager to be generated accordingly. For example, the number of Logical Banks and width of the Logical Banks are specified as parameters. When the specific system requirements are known, memory wrappers for the physical SRAM custom fit to the specified size can be created and written out in the HDL code. The number of Slots available for allocation by firmware is implemented with base Verilog template describing a register bit-map. This is built out to match the number of Slots indicated in the configuration file. Parameters are also used to define the internal FIFO sizes in the Client Bridge. These can be sized to match the system performance requirement for each Client and built out.

The auto-generation of the Buffer Manager HDL is very advantageous during projects whose requirements are not known ahead of time or which are dynamically changing with the customer requirements. When requirements become known or if customer specifications change, then the parameter file can be altered and a new HDL build generated which is suited for the new requirements. Previous methodologies involved hand-editing files of the base design in order to support the new changes, which is tedious, time consuming and prone to error. The auto-generation of the code is also beneficial for system analysis and prototyping. Multiple varying builds of the Buffer Manager can be generated using different requirements and then the area and timing tradeoffs measured between the builds in order to find the configuration best suited for the end application.

3.3 Generation Flow

The diagrams below depict the basic Buffer Manager auto-generation flow. The flow is identical for the two sample configurations. Each configuration uses the exact same Buffer Manager source Verilog template files but with a different source configuration file. The flow generates similarly named output design modules with the same basic structure. However the underlying design for each module is different and customized for each application. The scripts used to generate the HDL modules may be executed by a computers system, such as the computer system 100 of FIG. 1.

3.3.1 Low Cost/Low Power Buffer Manager

Figure 14:
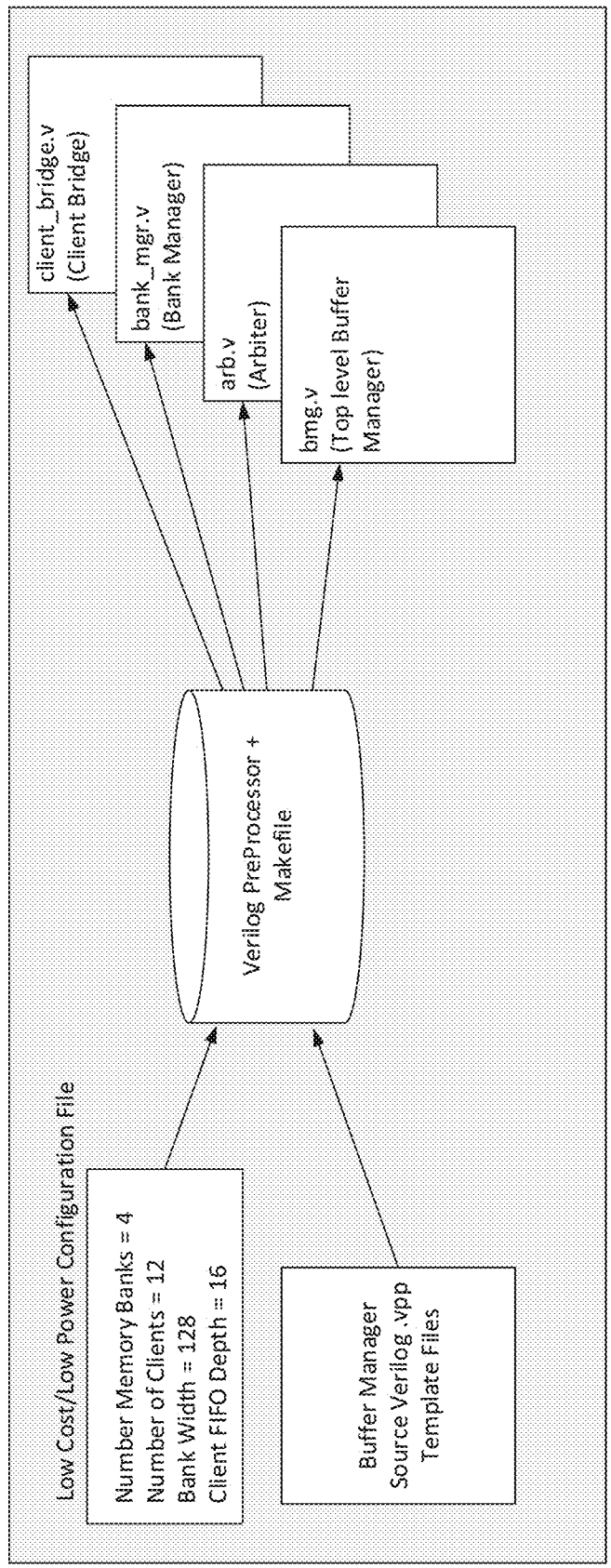
FIG. 14 is a diagram illustrating data files for generating a low cost and low power buffer in accordance with an embodiment of the present invention.

In the example of FIG. 14, a Configuration File is created with the parameter values set to describe a Buffer Manager for a low cost/low power application. This includes a lower number of memory banks, less Clients Requestors, a smaller memory bank width and a smaller Client FIFO Depth. A Makefile is used which reads the source Configuration file along with the Buffer Manager source Verilog template files. The Makefile runs the Verilog PreProcessor on the combination of the Configuration File and Verilog template files, and then generates the output HDL for the Buffer Manager design modules. In the example above, four such design modules are auto-generated by the Makefile: the top level Buffer Manager module, an arbiter design, the central Buffer Bank Manager and a Client Bridge. These modules all implement the HDL to describe a low cost/low power version of the Buffer Manager.

3.3.2 High Performance Buffer Manager

Figure 15:
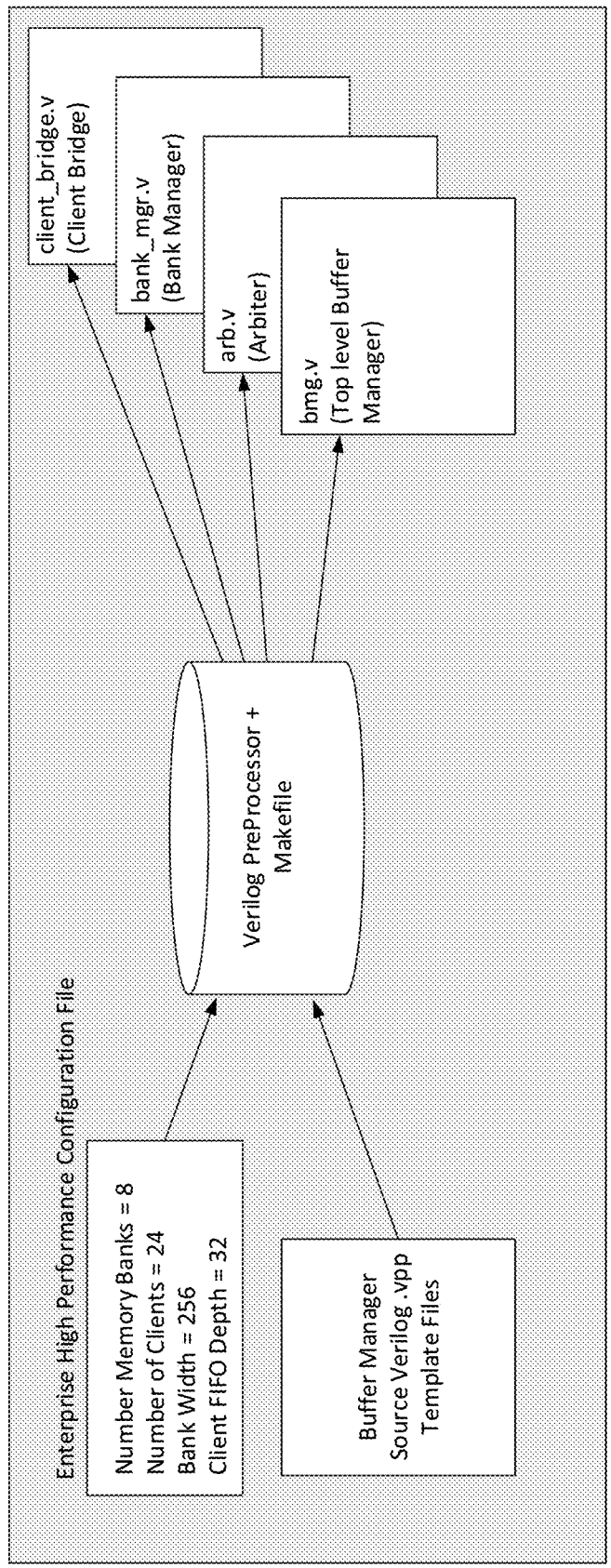
FIG. 15 is a diagram illustrating data files for generating a high performance buffer manager in accordance with an embodiment of the present invention.

In the example of FIG. 15, a Configuration File is created with the parameter values set to describe a Buffer Manager for a high performance Enterprise application. This includes a higher number of memory banks, more Client Requestors, a wider memory bank width and a larger Client FIFO Depth. A Makefile is used which reads the source Configuration file along with the Buffer Manager source Verilog template files. The Makefile runs the Verilog PreProcessor on the combination of the Configuration File and Verilog template files, and then generates the output HDL for the Buffer Manager design modules. In the example above, four such design modules are generated: the top level Buffer Manager module, an arbiter design, the central Buffer Bank Manager and a Client Bridge. These all implement the HDL to describe a high performance version of the Buffer Manager.

4 Summary

The embodiment defines an architecture and implementation strategy to create a Buffer Manager Design that is easily scalable in terms of performance, power and area. The design is built to use base template files, a configuration file of parameters, and scripting tools to allow the Verilog HDL code to be auto-generated through the use of the scripting tools. This allows different Buffer Manager Designs to be quickly and easily generated, and then integrated into chips used for variety of end-user applications, ranging from high performance systems to lower power and lower cost solutions. The ability for different designs to be generated off of the same database allows for faster product cycles and requires less design resources and less design maintenance as well.

The present invention may be embodied in other specific forms without departing from its spirit or essential characteristics. The described embodiments are to be considered in all respects only as illustrative, and not restrictive. In particular, although the methods are described with respect to a nand flash SSD, other SSD devices or nonvolatile storage devices such as hard disk drives may also benefit from the methods disclosed herein. The scope of the invention is, therefore, indicated by the appended claims, rather than by the foregoing description. All changes which come within the meaning and range of equivalency of the claims are to be embraced within their scope.

The invention claimed is:

1. A buffer, comprising:
a memory bank manager configured to receive requests from a plurality of clients, arbitrate the requests, and execute the requests;
a plurality of client bridges, each client bridge configured to manage an arbitration assignment from the memory bank manager; and
a clock rate manager configured to scale a clock frequency of the buffer manager based on a bandwidth throughput value for each client bridge of the plurality of client bridges,
wherein the memory bank manager is further configured to:
map an external slot address to a plurality of micro-slot addresses corresponding to physical locations within a plurality of memory banks that are the subject of the requests, and
translate requests, referencing the external slot address, to a plurality of micro-slot addresses.

2. The buffer of claim 1, wherein the clock rate manager is configured to monitor whether each client bridge of the plurality of client bridges is receiving a client request.

3. The buffer of claim 2, wherein the bandwidth throughput value for each client bridge of the plurality of client bridges is stored in a configuration register, and the configuration register is configured to mask a respective bandwidth throughput value for a corresponding client bridge from the clock rate manager when the respective client bridge is not receiving a client request.

4. The buffer of claim 1, wherein the clock rate manager is configured to compare the bandwidth throughput value for each client bridge of the plurality of client bridges against a set of threshold registers to determine a clock divide ratio to be utilized in scaling the clock frequency.

5. A method for generating a buffer specification comprising:
executing a script, utilizing a buffer template and a configuration file defining buffer manager parameters, to output instructions for generating a buffer; and
outputting, via a clock rate manager, a bandwidth signal for each client bridge of a plurality of client bridges, wherein executing the script includes outputting instructions defining a memory bank manager configured to:
receive requests and arbitrate and execute the requests with respect to a plurality of memory banks,
map an external slot address to a plurality of micro-slot addresses corresponding to a plurality of physical locations within the plurality of memory banks, and
translate requests referencing the external slot addresses to the plurality of micro-slot addresses.

6. The method of claim 5, wherein executing the script includes outputting instructions defining:
a client bridge definition, defining an input, an accumulation register configured to store requests from the input, and a client bridge state controller programmed to receive an arbitration assignment from the memory bank manager, and, in response to receiving the arbitration assignment, output requests stored in the accumulation register to the memory bank manager.

7. The method of claim 6, wherein:
the configuration file includes a number of clients; and
executing the script with respect to the buffer template and configuration file comprises outputting instructions for generating a plurality of client bridges having the client bridge definition, the plurality of client bridges corresponding to the number of clients in the configuration file.

8. The method of claim 6, wherein the method further comprises:
performing, via the memory bank manager, pipelined access of a plurality of memory banks for each request received from the client bridge whereby an address included in the request is accessed consecutively, from one memory bank of the plurality of memory banks per clock cycle until the address is accessed for each memory bank of the plurality of memory banks.

9. The method of claim 8, wherein the method further comprises:
initiating, via the memory bank manager, pipelined access of a plurality of memory banks once per clock cycle such that multiple pipelined accesses of the plurality of memory banks are performed simultaneously.

10. The method of claim 8, wherein the method further comprises:
configuring the memory bank manager to belong to a first clock domain; and
configuring a plurality of client bridges to belong to one or more second clock domains different from the first clock domain.

11. The method of claim 5, wherein the clock rate manager is configured to increase a frequency of a first clock domain in response to a first loading of a plurality of memory banks and decrease the frequency of the first clock domain in response to a second loading of the plurality of memory banks, the second loading being less than the first loading.

12. The method of claim 5, wherein the clock rate manger includes:
a masking stage configured to output the bandwidth signal for each client bridge of the plurality of client bridges, and
a block rate selection stage that selects the frequency of a first clock domain according to the bandwidth signals from the masking stage.

13. The method of claim 5, wherein the configuration file defines at least one of a number of memory banks, a memory bank width, a number of clients, and a client buffer depth.

14. The method of claim 13, wherein the buffer has the buffer manager is configured to have the at least one of the number of memory banks, the memory bank width, the number of clients, and the client buffer depth of the configuration file.

15. A buffer comprising:
a clock rate manager configured to output a bandwidth signal for each client bridge of a plurality of client bridges, wherein the clock rate manger includes:
a block rate selection stage to select a frequency of a first clock domain according to a bandwidth signal for each client bridge of the plurality of client bridges; and
a memory bank manager configured to:
receive requests, directed to a plurality of memory banks, across the plurality of client bridges and arbitrate and execute the requests;
map an external slot address to a plurality of micro-slot addresses corresponding to a plurality of physical locations within the plurality of memory banks; and
translate requests, referencing the external slot addresses, to the plurality of micro-slot addresses.

16. The buffer of claim 15, further comprising the memory bank manager configured to perform, for each request received from the client bridge, a pipelined access of a plurality of memory banks whereby an address included in the request is accessed consecutively, from one memory bank of the plurality of memory banks per clock cycle until the address is accessed for each memory bank of the plurality of memory banks.

17. The buffer of claim 16, wherein the memory bank manager is further configured to:
perform an arbitration assignment among the plurality of client bridges according to a round robin algorithm.

18. The buffer of claim 16, wherein the memory bank manager is further configured to:
belong to a first clock domain; and
each of the plurality of client bridges are configured to belong to one or more second clock domains different from the first clock domain.

19. The buffer of claim 16, wherein the clock rate manager is configured to increase a frequency of the first clock domain in response to a first loading of a plurality of memory banks and decrease the frequency of the first clock domain in response to a second loading of the plurality of memory banks, the second loading being less than the first loading.

20. The buffer of claim 16, wherein the clock rate manager includes:
a masking stage configured to output the bandwidth signal for each client bridge of the plurality of client bridges, the bandwidth signal for each client bridge of the plurality of client bridges that is currently processing requests being a bandwidth requirement for the each client bridge, the bandwidth signal for each client bridge of the plurality of client bridges that is not currently processing requests being zero.

* * * * *